F. W. SMITH, JR.

ACCOUNT DEPOSIT BOOK.

APPLICATION FILED JULY 5, 1918.

Reissued Aug. 13, 1918.

14,502.

2 SHEETS—SHEET 1.

Friend W. Smith, Jr.

INVENTOR

BY Wm. B. Whitney

ATTORNEY

F. W. SMITH, JR.
ACCOUNT DEPOSIT BOOK.
APPLICATION FILED JULY 5, 1918.
Reissued Aug. 13, 1918.
14,502.
2 SHEETS—SHEET 2.
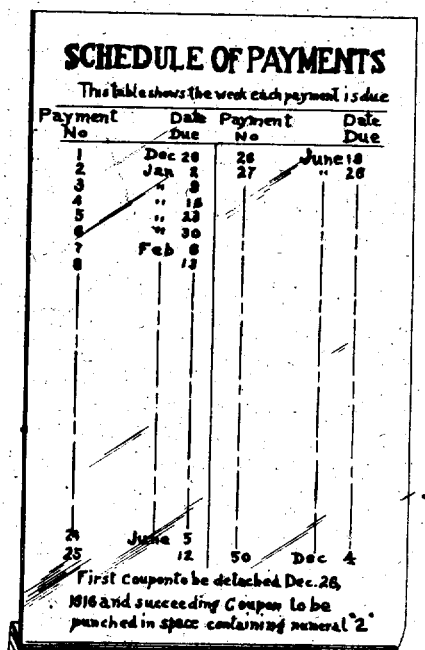
Fig. 4.
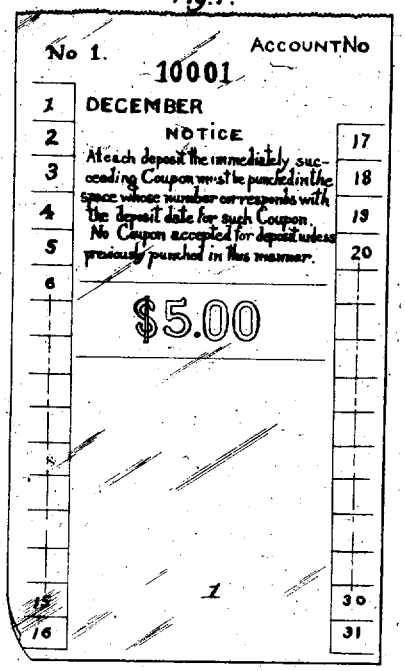
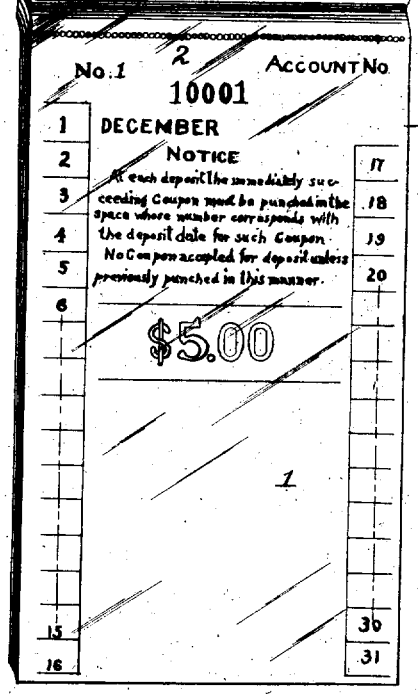
Fig. 3.
Fig. 5.
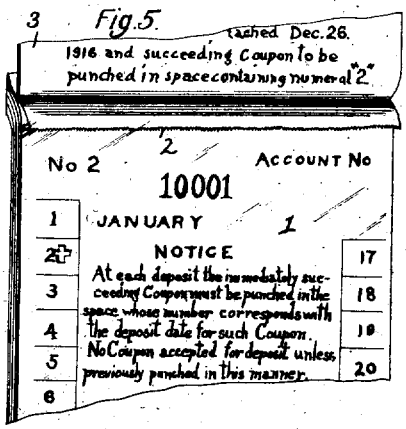
Frank W. Smith Jr.
INVENTOR
BY Wm. B. Whitney
ATTORNEY

UNITED STATES PATENT OFFICE.

FRIEND W. SMITH, JR., OF BRIDGEPORT, CONNECTICUT, ASSIGNOR, BY MESNE ASSIGNMENTS, TO GEORGE E. CARHART, OF NEW YORK, N. Y.

ACCOUNT DEPOSIT-BOOK.

14,502. Specification of Reissued Letters Patent. Reiss Aug. 13, 1918.

Original No. 1,252,961, dated January 8, 1918, Serial No. 125,115, filed October 11, 1916. Application for reissue filed July 5, 1918. Serial No. 242,478.

*To all whom it may concern:*

Be it known that I, FRIEND W. SMITH, Jr., a citizen of the United States, residing at Bridgeport, in the county of Fairfield and State of Connecticut, have invented a certain new and useful Improvement in Account Deposit-Books, of which the following is a specification.

Figure 1:
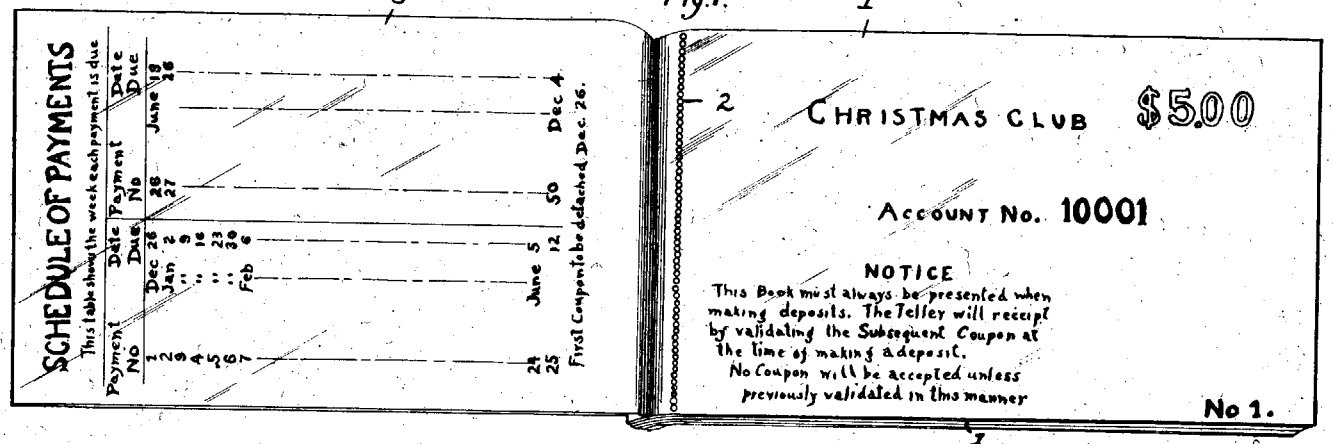
Figure 2:
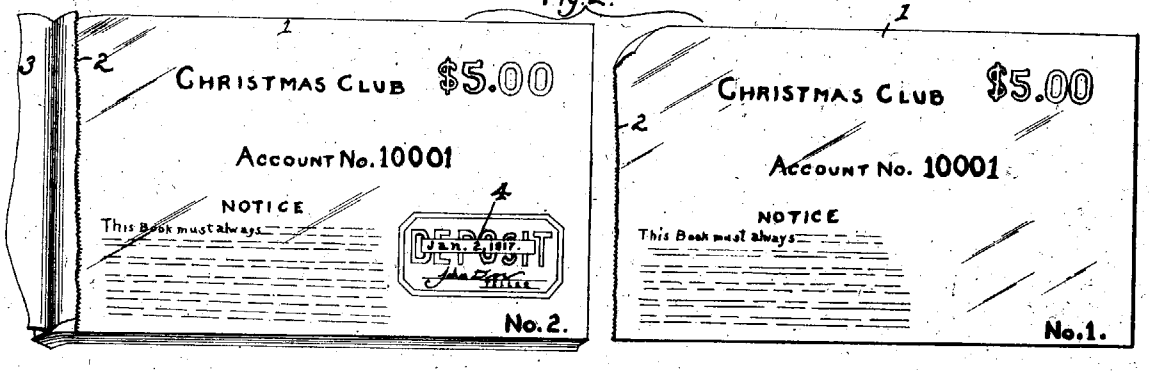

My present invention pertains to an improved account deposit book, the construction and advantages of which will be hereinafter set forth, reference being had to the annexed drawings, wherein:

Figure 1 is a perspective view of a book, with the upper cover-board thrown back, illustrating one embodiment of the invention;

Fig. 2 a similar view showing the first leaf removed and the second leaf validated, the cover-board being broken away;

Fig. 3 a perspective view of a book illustrative of another embodiment of the invention;

Fig. 4 a similar view of the first removed leaf; and

Fig. 5 a like view showing the manner in which the next succeeding leaf, in this instance the second leaf, is validated upon the removal of the immediately preceding leaf.

Of late there has come into vogue a special form of savings account, now commonly known as "Christmas accounts", "Thrift clubs", and the like, under which a specified number of payments is made during the calendar year, usually one a week, and at the end of a specified period the depositor is entitled to withdraw a fixed or determinate amount, commonly the amount paid in plus the agreed interest or a bonus on such amount. The present invention has to do with the handling of such accounts.

The main object of the invention is to produce a book which lends itself to the ready use of keeping track of such a special account between a banking institution and a particular customer or depositor, the structure being such as to facilitate the transaction between the bank and the customer at each time of payment, and the making of such a record that both parties will have in their possession a record of what has been done or paid.

Inasmuch as most, if not all, of the account which the book may establish require a payment on given days or within a given specified time, it is necessary that the payments be handled with facility, in order to avoid delay and waiting on the part of the customers.

Referring first to Figs. 1 and 2, 1 denotes the leaves, preferably perforated as at 2, to admit of ready detachment of the leaf, and 3 the front cover-board. The latter will preferably have a table or schedule of payments appearing thereon and in the form illustrated shows the number of payments and the date when each is due and payable. The cover-board may also contain such other printed matter, as directions and rules, as may be desired by any particular institution employing the books. The leaves will bear serial designations, as 1, 2, 3, etc., and each will preferably bear an account number, as 10,001, which number is placed against the depositor's name in the bank's records. The leaves may also contain any notice or rule found desirable to facilitate the carrying out of the transaction and also any other matter such as "Christmas Club" and $5.00, the latter indicating as desired either the total sum which is eventually paid in on the account, say in fifty payments of ten cents each, or the amount which is called for by the individual coupons.

In opening an account, the bank takes the name of a customer, assigns the same a particular number and issues a book numbered to correspond; upon the payment of the first instalment, the teller (or other officer) removes the first leaf (No. 1) and validates leaf number 2, by imprinting any suitable matter thereon, as for instance, the word "Deposit" with the date of the next payment, as indicated at 4, or the date of payment of the last preceding leaf. A blank space may be left for the reception of this stamp, or it may be imprinted or impressed on any portion thereof; in other words, the entire face of the leaf may be considered a space for the reception of such imprint. The bank, of course, files away the removed leaf or makes a record of payment corresponding to the leaf. The book with the remaining leaves is returned to the depositor. When it is again presented to the bank, the teller will at once see that all previous payments have been made, this by reason of the validating mark upon the then first remaining leaf in the book. The customer will likewise be safe-guarded.

In Figs. 3, 4 and 5 the same scheme is present in a slightly different embodiment. The leaves in this instance are shown as serially numbered, but this is not absolutely essential. Each sheet has thereon a series of numerals, from 1 to 31 inclusive, and preferably, as shown, these are arranged in spaces provided along each side or edge of the sheet. Each sheet will preferably have an account-number and will have the month within which it use falls printed thereon, as December, January, etc., there being at least the requisite number of leaves for each month.

When a depositor opens his account, the bank teller removes the first sheet and punches the next coupon. If the first date falls, say, on December 26th, the teller, after removing the first sheet, punches out the numeral 2 on the first January sheet, thereby validating said sheet and indicating the date when the next payment falls due, to wit, January 2nd. When the depositor again comes to the bank, on January 2nd, the teller notes that the January 2nd sheet has been validated, indicating that the previous payment has been made and he, therefore, accepts it, along with the necessary deposit, and punches the next sheet in the space denoted by the numeral 9, thereby validating it and showing the next payment is due January 9th, and so on.

Thus, it will be noted that the bank is protected while the depositor is likewise protected, since he always has in his possession the book whose deposit dates are vouched for by the bank by advance validation.

In order to reduce the printing expense to a minimum, and to render the books available from year to year, there may be five leaves for each month, since in some years there will be five deposit dates in a month and in other years only four. Also, each leaf has thirty-one punching spaces, because some months have thirty-one days and it is cheaper to print thirty-one spaces on each leaf rather than to print the proper spaces for each month. Each batch of five coupons has printed thereon its proper month and where there are only four deposit-dates in a month the teller tears out and casts away the extra coupon for that month when the last payment, to wit, the fourth, is made for that month. Inasmuch as the schedule of payments is always before the teller, he can punch the proper number without confusion.

Where extra leaves are present, the leaves for each month might be serially numbered instead of being numbered consecutively throughout the book.

Under both forms described it will be noted that the validation of the sheet immediately following the sheet removed by the teller completes the operation and secures a record both to the bank and to the customer or depositor. Either arrangement permits ready despatch of the business.

Having thus described my invention, what I claim is:

1. A deposit book adapted, by the validation of each sheet by a bank official, to indicate that the previous payments have been made and likewise to indicate the date of the next payment, said sheet thus validated being adapted to be removed from the book and retained by the bank as a record of payment as the next succeeding sheet is validated, comprising a plurality of detachable leaves, said leaves throughout having a common designation and an indicia of the amounts to be paid and also being sequentially marked, each leaf having a space for the validation thereof by the marking thereon of the date when the deposit becomes payable.

2. A deposit book adapted, by the validation of each sheet by a bank official, to indicate that the previous payments have been made, said sheet thus validated being adapted to be removed from the book and retained by the bank as a record of payment as the next succeeding sheet is validated, comprising a plurality of detachable leaves which throughout have a common designation and an indicia of the amounts to be paid and also are sequentially marked and have a space for the validation thereof.

3. An instalment account book which comprises a plurality of leaves each consisting of a blank binding stub and a detachable sheet bearing a sequential mark, a mark common to all of the sheets, and an indicia of the amount to be paid thereon and also providing a place for a suitable validating mark, said book being adapted, on the removal of the sheets at intervals and the validation of the first of the sheets remaining, to serve as a receipt for the payment of the amount called for by the sheet or sheets which have been removed.

4. The method of instalment payment accounting which comprises issuing to the person who is to make the payments a book with detachable sheets, removing therefrom and retaining the first and each succeeding sheet in turn on payment of the amount called for thereby, and placing on the first of the sheets remaining after each payment a suitable mark to serve as a receipt for the holder of the book that the amount called for by the sheet or sheets removed has been paid.

5. The method of instalment payment accounting which comprises issuing to the person who is to make the payments, to be presented with each payment and retained until the account is closed, a coupon book containing a series of detachable sheets each bearing a serial number, a mark common to all of the sheets, and an indicia of the amount to be paid, removing therefrom and filing the first and each succeeding sheet in turn on the payment of the amount called for thereby, and receipting for the amount paid on the sheet or sheets removed by placing a suitable mark on the first of the sheets remaining in the book.

FRIEND W. SMITH, Jr.